United States Patent
Delaney et al.

(10) Patent No.: US 7,440,472 B2
(45) Date of Patent: Oct. 21, 2008

(54) METHODS AND SYSTEMS FOR PROVIDING WIRELESS LOCAL AREA NETWORK (WLAN)—BASE TRANSCEIVER STATION (BTS) GATEWAY

(75) Inventors: Robert J. Delaney, Raleigh, NC (US); Todd Eichler, Wake Forest, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 843 days.

(21) Appl. No.: 10/929,960

(22) Filed: Aug. 30, 2004

(65) Prior Publication Data

US 2005/0083971 A1    Apr. 21, 2005

Related U.S. Application Data

(60) Provisional application No. 60/498,415, filed on Aug. 28, 2003.

(51) Int. Cl.
*H04J 3/16* (2006.01)

(52) U.S. Cl. .................... 370/466; 370/474

(58) Field of Classification Search .............. 370/466, 370/467, 338, 337, 436, 392, 469, 328, 473, 370/474, 475, 352, 465, 394, 382, 354, 410, 370/395.63; 379/228, 230, 229
See application file for complete search history.

(56) References Cited

U.S. PATENT DOCUMENTS 5,926,757 A    7/1999    Luijten et al.
6,195,555 B1   2/2001    Dent
6,411,632 B2   6/2002    Lindgren et al.
6,418,319 B1   7/2002    Dent
6,542,716 B1   4/2003    Dent et al.
6,545,987 B1   4/2003    Becher
6,546,242 B1   4/2003    Alperovich et al.

(Continued)

FOREIGN PATENT DOCUMENTS

EP    1 199 842       4/2002
WO    03/063404       7/2003

OTHER PUBLICATIONS

Notification Concerning Transmittal of International Search Report in International Application No. PCT/US2004/28138 (Aug. 30, 2004).

(Continued)

*Primary Examiner*—Chi H. Pham
*Assistant Examiner*—Alexander O. Boakye
(74) *Attorney, Agent, or Firm*—Jenkins, Wilson, Taylor & Hunt, P.A.

(57) ABSTRACT

Methods and systems for providing a WLAN-BTS gateway are disclosed. A handset registers with a WLAN-BTS gateway. The handset then initiates a call by initiating layer 3 air interface signaling with a BTS. The gateway forwards the layer 3 air interface signaling between the gateway and the handset. The gateway learns the control channel and traffic channel allocated to the call, either directly from the layer 3 signaling or from a separate message received from the handset. Once the call is connected, the gateway listens on the traffic channel and forwards voice packets between the handset and the BTS. Communications with the BTS occur over the allocated traffic channel. Communications with the handset occur over a WLAN.

28 Claims, 13 Drawing Sheets

U.S. PATENT DOCUMENTS

| | | | |
|---|---|---|---|
| 6,600,734 | B1 | 7/2003 | Gernert et al. |
| 6,611,684 | B1 | 8/2003 | Franks |
| 6,611,692 | B2 | 8/2003 | Raffel et al. |
| 6,708,031 | B2 | 3/2004 | Purnadi et al. |
| 7,006,481 | B2 * | 2/2006 | Terry .......................... 370/338 |
| 2003/0051041 | A1 | 3/2003 | Kalavade et al. |
| 2003/0139180 | A1 | 7/2003 | McIntosh et al. |
| 2003/0169713 | A1 | 9/2003 | Luo |
| 2004/0001468 | A1 | 1/2004 | Bichot et al. |
| 2004/0002335 | A1 | 1/2004 | Pan et al. |
| 2004/0081248 | A1 | 4/2004 | Parolari |
| 2005/0025164 | A1 | 2/2005 | Kavanagh et al. |
| 2005/0157673 | A1 * | 7/2005 | Verma et al. ................ 370/328 |

OTHER PUBLICATIONS

Commony-assigned, co-pending U.S. Appl. No. 11/227,427 for "Methods, Systems, and Computer Program Products for Providing Wireless-Fidelity (Wi-Fi) Gateway Visitor Location Register (VLR) Functionality," (Unpublished, filed Sep. 15, 2005).
"CORBA® Basics," Object Management Group, http://www.omg.org/gettingstarted/corbafaq.htm., pp. 1-5 (May 26, 2005).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," PACKET, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 For Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN SIM Authentication and Authorization," Cisco Systems, Inc., pp. 1-13 (Copyright 1992-2003).
Barry, "A Signal for Savings," PACKET, Cisco Systems Users Magazine, vol. 14, No. 4, pp. Cover; 19-21; and 81 (Fourth Quarter 2002).
"Agilent Technologies and Cisco Systems SS7 over IP White Paper," Cisco Systems, Inc. and Agilent Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
"Agilent acceSS7 Business Intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Topsail Beach—SS7 Over IP—Cisco Systems, Inc., pp. 1-16 (Copyright 1999).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).
"Configuring ITP Optional Features," IP Transfer Point, Cisco IOS Release 12.2(4)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
UMA Technology: Overview, http://umatechnology.org/overview/index.htm, pp. 1-2 (2004).
Kewney, "News—Palm Goes for Voice Over WiFi and Internet—Using Cisco Tech," pp. 1-3 (May 30, 2003).
"Stu's Weblog," pp. 1-2 (May 17, 2003).
Tehrani, "The Rise of Enterprise WiFi Telephony," Internet Telephony Publisher's Outlook, pp. 1-5 (Mar. 2003).
"First Public WLAN to GSM Network Aggregation Service Launched as WeRoam® Goes Commercial with Transat Software," Transat Technologies, pp. 1-2 (Nov. 23, 2002).
Werbach, "Sifry's Alerts: Kevin Werbach on Wifi PBXs," pp. 1-2 (Oct. 10, 2002).
Werbach, "Open Spectrum: The New Wireless Paradigm," New America Foundation, pp. 1-20 (Oct. 2002).
Orzech, "WLAN Software Turns PDAs Into Cell Phones," pp. 1-2 (Sep. 18, 2002).
Griffith, "The Marriage of WLAN to GSM," pp. 1-2 (Aug. 22, 2002).
Blackwell, "Inter-network Roaming," pp. 1-4 (Jun. 28, 2002).
Sutherland, "Mobile Carriers Weave Wi-Fi," pp. 1-3 (May 17, 2002).
"Sifry's Alerts: Transat Technologies Raises $6 Million Series A," p. 1 (May 7, 2002).
Blackwell, "Wireless Anywhere—Even Miles from an Access Point?" pp. 1-3 (Apr. 22, 2002).
Liu, "Deutsche Telekom to Integrate Cell/WLAN Service," pp. 1-2 (Mar. 8, 2002).
*allNetDevices Staff*, "Antenna Combines WLAN, Cellular, GPS," p. 1 (Dec. 5, 2001).
Haskin, "Global Roaming Breakthrough Claimed," http://www.internetnews.com/wireless/print.php/900871, pp. 1-2 (Oct. 10, 2001).
Peretz, "COPS to Enable Global Roaming Across Cellular And WLANs," p. 1 (Oct. 9, 2001).
Heine, "GSM Networks: Protocols, Terminology, and Implementation, *Scenarios*," Mobile Communications Series, pp. 233-250 (1999).
"GSM Signaling Platform: WLAN and GSM Interconnection Application," Performance Technologies, pp. 1-2 (Publication Data Unknown).
"Seamless WLAN/GSM Roaming on All Enabled Hotspots Worldwide," WERoam, pp. 1-4 (Publication Data Unknown).
"Voice-over-IP Network Appliance," WiFi® Phone, pp. 1-5 (Publication Date Unknown).
"Wireless LAN the Easy Way: Transat Introduces the Affordable Solution for WLAN-enabled 3G Services," pp. 1-2 (Publication Data Unknown).

* cited by examiner

METHODS AND SYSTEMS FOR PROVIDING WIRELESS LOCAL AREA NETWORK (WLAN)—BASE TRANSCEIVER STATION (BTS) GATEWAY

PRIORITY CLAIM

This application claims the benefit of U.S. Provisional Patent Application No. 60/498,415, filed Aug. 28, 2003, the disclosure of which is incorporated herein by reference in its entirety.

TECHNICAL FIELD

The present invention relates to methods and systems for providing improved access to base station subsystems in mobile communications networks. More particularly, the present invention relates to methods and systems for providing a WLAN-BTS gateway.

BACKGROUND ART

In mobile communications networks, the air interface is the interface between a mobile handset and a base transceiver station. For voice telephone calls, typical air interface protocols use frequency division multiple access (FDMA), code division multiple access (CDMA), or time division multiple access (TDMA) to provide multiple channels between the BTS and the mobile handsets. In GSM networks, a combination of TDMA and FDMA is used.

One problem with conventional mobile communications networks is that the voice and control signals may be weakened inside of structures, such as buildings, due to poor frequency penetration, scattering, fading, or other undesirable signal effects. As a result, when a mobile user desires to use his or her handset within a structure, access to the network will be either impossible or of very poor quality.

WLAN protocols, such as the IEEE 802.11x family of protocols, are increasingly being used to provide broadband Internet access inside of buildings. For example 802.11 access points are commonly used within homes, offices, hotels, airports, and coffee shops to provide wireless broadband Internet access to users inside of the buildings. While WLAN protocols are increasingly being used to provide wireless data access within structures, these protocols are not typically used to provide voice network access, such as mobile voice communications network access, within structures.

Current attempts to use WLAN and air interface protocols in the same equipment utilize WLAN and air interface protocols independently to provide broadband voice and data access. For example, WLAN and GSM transceivers have been used independently to allow private user equipment to connect to a public cellular network and a broadband data connection. However, there is currently no known solution that seamlessly combines WLAN protocols with air interface protocols to provide improved voice communications access to the telephone network.

Accordingly, in light of the shortcomings associated with conventional mobile communications networks and the availability WLAN protocols, there exists a need for improved methods and systems for using WLAN and air interface protocols in combination to provide improved voice communications access to the telephone network.

DISCLOSURE OF THE INVENTION

According to one aspect, the present invention includes a method for transparently initiating and terminating calls with a mobile handset using a WLAN-BTS air interface gateway. The method includes registering a mobile handset with a WLAN-BTS gateway. When the handset initiates or receives a call, layer 3 air interface protocol signaling originating from the handset may be carried over the WLAN to the gateway. The gateway may forward air interface signaling to a BTS over the air interface. The gateway may learn the control channel used to carry the signaling from the signaling messages themselves or from a separate message from the handset. Once the gateway learns the assigned control channel, the gateway can listen for incoming messages from the BTS and forward those messages to the handset over the WLAN. Messages to and from the handset for a specific channel may be identified using the MAC address of the handset.

Because the layer 3 air interface protocol signaling is controlled by the handset, the gateway design can be simplified in that the gateway remains transparent to the BTS, and the handset can function independently of the gateway when making non-WLAN air interface connections. In addition, when the handset moves outside of the areas served by the WLAN and into an area served by the air interface, the handset may automatically switch from the WLAN protocol to the air interface protocol and continue a call that was previously carried over the WLAN. This is possible because the handset has all of the channel information required to implement a layer 1 and 2 air interface connection with the BTS. Similarly, when the handset moves from an area served by the air interface to an area served by the WLAN (provided that the handset has previously registered with the gateway), the handset may automatically switch to the WLAN protocol and continue a call that was previously carried over the air interface. In this case, the handset may send a message to the gateway informing the gateway of the control and traffic channels allocated to the call. The gateway may then intercept the signaling and voice stream and forward the signaling and voice stream to and from the handset over the WLAN.

Once the call setup signaling is complete, an air interface traffic channel exists between the gateway and the BTS. At the gateway, an incoming voice or media stream associated with the call is intercepted and converted from the air interface protocol to a WLAN protocol. The gateway forwards the incoming voice or media stream to the handset via the WLAN protocol. At the gateway, the outgoing voice or media stream associated with the call is converted to the air interface protocol. Because the gateway converts between the WLAN and air interface protocol and operates transparently to a base station system, calls to and from a mobile handset can be completed, even in areas of low signal strength.

Accordingly, it is an object of the invention to provide a method for transparently initiating and terminating voice calls with a mobile handset using a WLAN-BTS gateway.

It is another object of the invention to provide a WLAN-BTS air interface gateway that operates transparently to a BTS and allows completion of calls to and from a mobile handset in areas of low signal strength.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
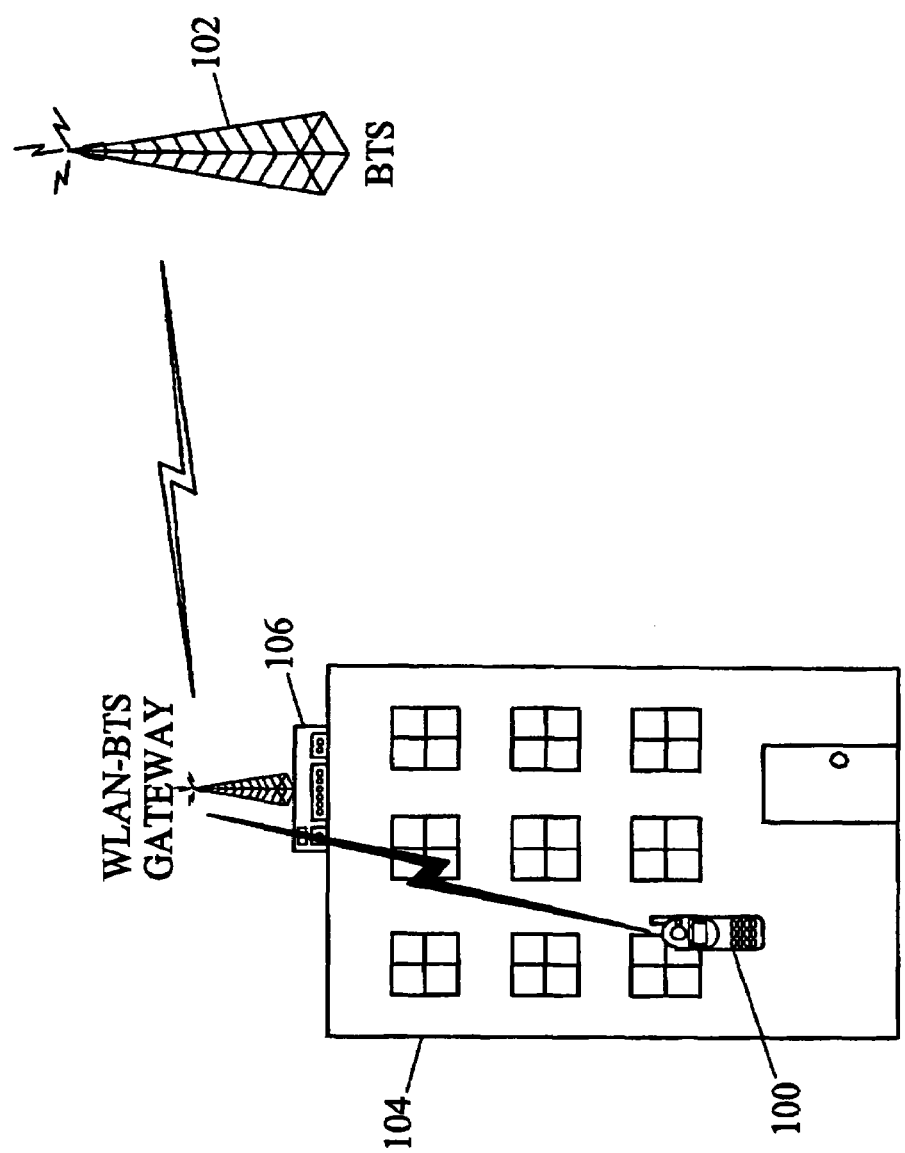
FIG. 1 is a schematic diagram illustrating overall operation of a WLAN-BTS gateway according to an embodiment of the present invention.

As stated above, one potential use for the methods and systems described herein is to establish calls originating from a mobile handset when the mobile handset is an area of weak signal strength through the normal air interface protocol used by the base station but in an area where WLAN access is available. FIG. 1 illustrates an exemplary operating environment for a WLAN-BTS gateway according to an embodiment of the present invention. Referring to FIG. 1, a mobile handset 100 may encounter weak signal strength from base transceiver station 102 when mobile handset 100 is inside of a building 104. Building 104 may be any type of building, such as a hotel, an office, a residence, or any other type of structure or area that may reduce mobile telephone signal quality. Handset 100 may include a standard air interface protocol stack for communicating with base transceiver station 102. For example, handset 100 may include a GSM protocol stack, an IS-41 protocol stack, or both. Handset 100 may also include a WLAN protocol stack for communicating with WLAN-BTS gateway 106. According to an important aspect of the invention, handset 100 is preferably capable of initiating and terminating layer 3 air interface protocol signaling over a WLAN. Providing a handset that performs layer 3 signaling over a WLAN simplifies gateway design, increases gateway transparency to the BTS, and facilitates movement between WLAN coverage areas and air interface coverage areas without loss of existing traffic channel connections. For example, if handset 100 establishes an air interface traffic channel between gateway 106 and BTS 102 using air interface signaling that handset 100 initiates and terminates, handset 100 will be aware of the channel being used. As a result, when handset 100 leaves building 104, handset 100 can seamlessly switch from the WLAN to the allocated traffic channel over the air interface.

WLAN-BTS gateway 106 may include an air interface protocol stack for communicating with BTS 102 via a standard air interface. The standard air interface protocol stack may include an IS-41 protocol stack, a GSM protocol stack, or both. In order to communicate with handset 100, gateway 106 may include a WLAN protocol stack.

Figure 2:
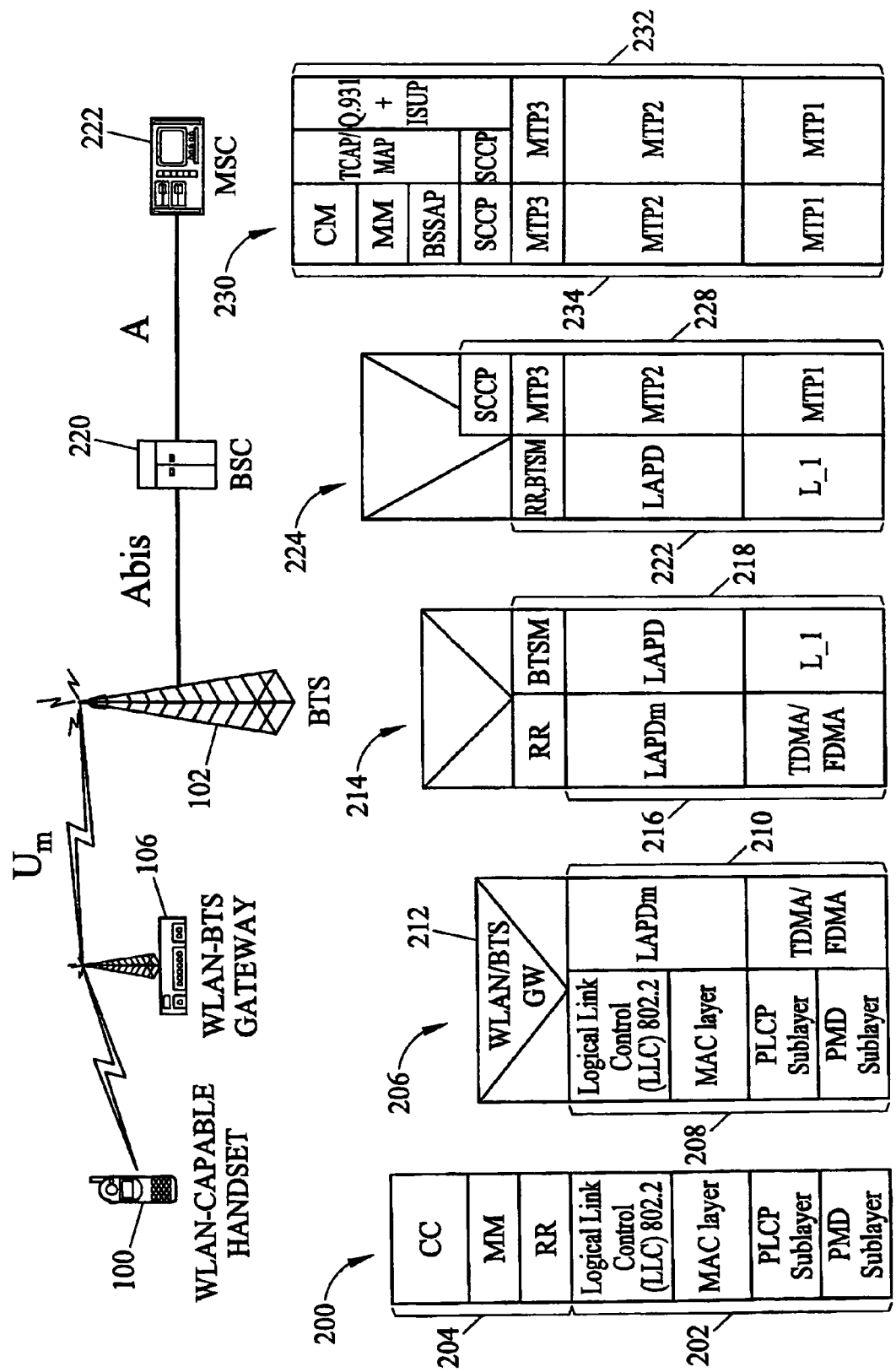
FIG. 2 is a protocol layering diagram illustrating exemplary protocol layers implemented by entities communicating via a WLAN-BTS gateway according to an embodiment of the present invention.

FIG. 2 illustrates the communicating entities of FIG. 1 in more detail and their respective protocol stacks. In addition, FIG. 2 also includes other signaling entities in a mobile communications network. Referring to FIG. 2, WLAN- and air-interface-capable handset 100 includes a protocol stack 200 that includes a WLAN portion 202 and an air interface control portion 204. WLAN portion 202 includes and physical datalink layers for sending and receiving data over a WLAN link. In the illustrated example, these layers include a physical media dependent (PMD) sublayer, a physical layer convergence procedure (PLCP) sublayer, a medium access control (MAC) layer, and a logical link control (LLC) layer. The function of WLAN layers 202 is to provide transport of air interface signaling and bearer data to gateway 106 via a WLAN protocol. These layers may be implemented using any suitable WLAN protocol, including 802.11x, where x equals a, b, or g, 802.16x, or other suitable WLAN protocol.

Air interface control portion 204 includes a radio resource (RR) management layer, a mobility management (MM) layer, and a call control (CC) layer. The purpose of the layers in stack portion 204 is to communicate with BTS 106 and establish control and traffic channels. According to the present embodiment, these layers are preferably not implemented at gateway 106. That is, in this embodiment, gateway 106 simply passes messages from these layers to the corresponding layers at BTS 102. Message flows implemented by these layers will be described in detail below.

Gateway 106 implements a composite protocol stack 206 including a WLAN portion 208, a cellular (e.g. GSM) air interface portion 210, and a WLAN-BTS gateway portion 212. WLAN portion 208 corresponds to WLAN portion 202 in protocol stack 200 of handset 100. That is, WLAN portion 208 may implement any of the above-referenced WLAN protocols corresponding to the protocol implemented by handset 100. GSM portion 210 may implement GSM air interface protocols such as $LAPD_m$ and a TDMA/FDMA physical layer protocol. WLAN-BTS gateway layer 212 translates messages from the protocols represented by WLAN portion 208 and the protocols represented by GSM portion 210.

Because WLAN-BTS gateway 106 is capable of transparently sending and receiving radio resource management information to and from BTS 102, BTS 102 may implement a standard GSM (or other air interface) protocol stack 214. In the illustrated example, protocol stack 214 includes an interface portion 216 and an $A_{bis}$ interface portion 218. Air interface portion 216 includes layers that correspond to air interface portion 210 of WLAN-BTS gateway 106 and the air interface portion 204 of WLAN capable phone 100. $A_{bis}$ interface 218 includes signaling channels for communicating with base station controller (BSC) 220. In the illustrated example, these layers include a PSTN layer, a LAPD layer, and an L1 layer.

Base station controller 220 may control multiple base transceiver stations 102 for allocation of signaling channels among handsets and handovers between base transceiver stations. Base station controller 220 may also implement SS7 signaling protocols for communicating with mobile switching center (MSC) 222 over the A interface. In the illustrated example, base station controller 220 implements a protocol stack 224 that includes BTS signaling portion 226 having an L1 layer, a LAPD layer, and an RR, BTSM layer. Protocol stack 224 also includes A link portion 228 including various signaling layers for communicating with MSC 222. In the illustrated example, these layers include a message transfer part level 1 (MTP1) layer, an MTP2 layer, an MTP3 layer, and a signaling connection control part (SCCP) layer. MTP 1 and 2 layers perform physical and datalink layer functions for SS7 network signaling. The MTP3 layer performs MTP level 3 functions, such as message routing. The SCCP layer provides a routing mechanism for higher level protocols, such as transaction capabilities application part (TCAP), mobile application part (MAP), and base station subsystem application part (BSSAP) using information stored in the SCCP portion of the message. This information can include point codes and global title addresses.

MSC 222 performs switching office functions for the mobile communications network. MSC 222 includes a protocol stack 230. Protocol stack 230 includes a call setup signaling portion 232 and a BSC signaling portion 234. Call setup signaling portion 232 includes various layers for sending call setup signaling messages to other entities in a mobile communications network. In the illustrated example, the most important layer associated with call setup is the Q.931 and ISUP layer. The Q.931 and ISUP layer originates Q.931 or ISUP setup signaling messages to establish and terminate calls with other endpoints. The TCAP/MAP layer performs signaling functions for accessing mobile communications databases, such as HLRs and VLRs to obtain mobile subscription information. The SCCP and MTP 1-3 layers perform the same functions as those described with regard to protocol stack 224.

Figure 3:
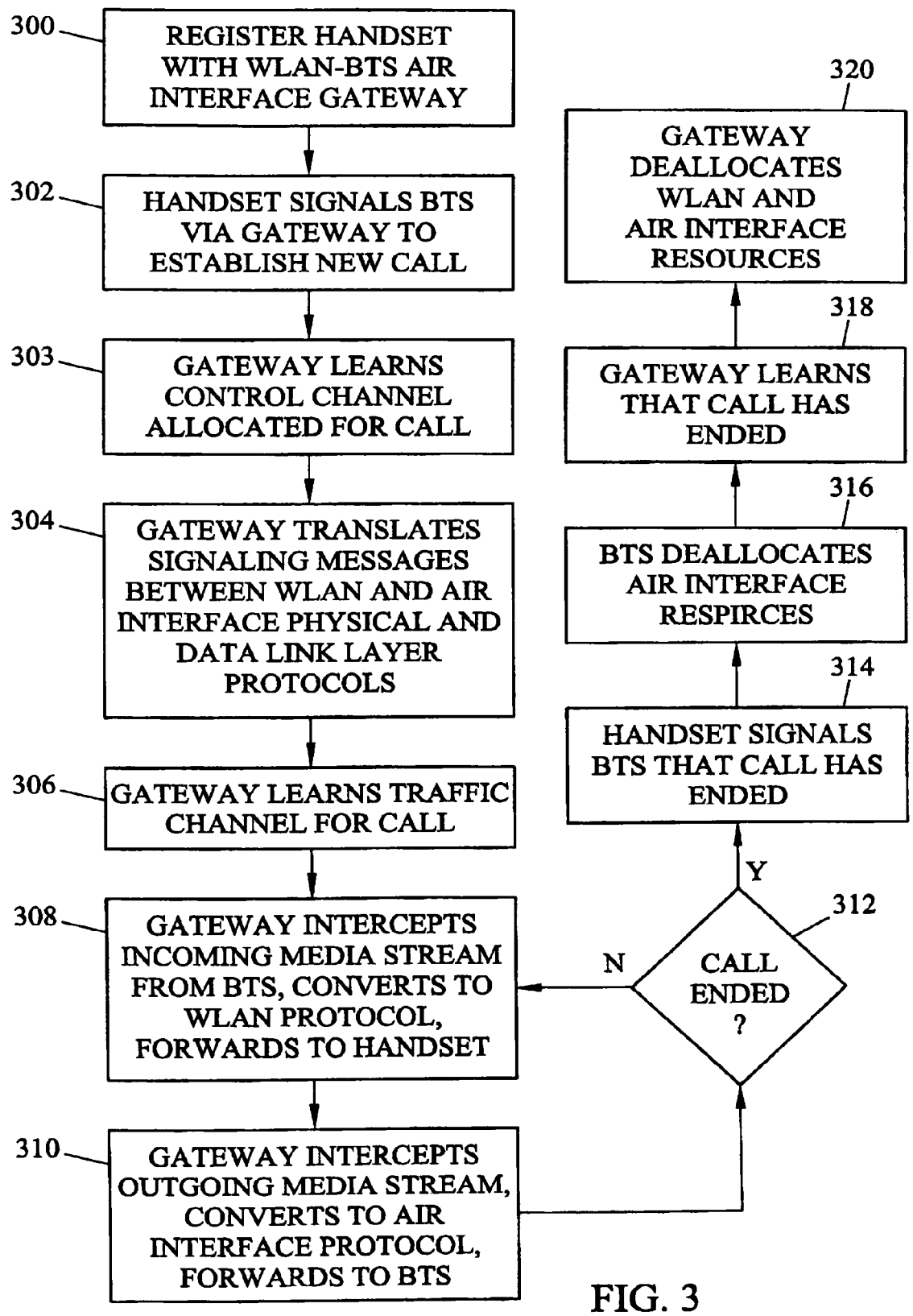
FIG. 3 is a flow chart illustrating exemplary steps for establishing a call using a WLAN-BTS gateway according to an embodiment of the present invention.

FIG. 3 is a flow chart illustrating exemplary overall steps for originating a call from a WLAN-capable handset using a WLAN-BTS air interface gateway according to an embodiment of the present invention. Referring to FIG. 3, in step 300, the WLAN capable handset is registered with a WLAN-BTS air interface gateway. This step may be performed by the mobile service provider at the time the handset is created or issued to a mobile subscriber. Alternatively, this step may be performed when the subscriber enters an establishment that has a WLAN-BTS gateway. For example, when a subscriber checks into a hotel, the subscriber may register his handset with the WLAN-BTS air interface gateway during check in. Exemplary information that may be provided to the WLAN-BTS air interface gateway during registration may include the MSISDN number associated with the mobile subscriber, the IMSI, and any encryption keys used to encrypt and decrypt signaling information sent over the air interface. Registration may be performed automatically by a WLAN capable handset. Alternatively, registration may be implemented by having the user insert his or her SIM card in a corresponding reader associated with the WLAN-BTS air interface gateway.

After registration, when a subscriber desires to initiate a call, the handset signals the BTS via the gateway to establish the new call. Such signaling involves obtaining air interface control and traffic channels from the BTS. Exemplary signaling messages for obtaining the control and traffic channels over the air interface will be described in detail below. In step 303, the gateway learns the control channel for the call. This step is necessary so that the gateway can intercept messages from the BTS for the call over the air interface. This step may be performed by analyzing the response to channel request transmitted over a randomly allocated control channel by the gateway on behalf of the handset.

Once the gateway learns the control channel, in step 304, the gateway translates signaling messages between WLAN and air interface physical and data link layer protocols. Referring back to FIG. 2, this step may be performed by translating between the layers indicated by protocol stack portion 208 and protocol stack portion 210 in protocol stack 206. The gateway preferably sends the signaling messages to the BTS via the air interface and to the handset via the WLAN interface. Because the gateway translates signaling from the WLAN protocols to the air interface protocols, the gateway and the conversion are transparent to the BTS.

In step 306, the gateway learns the traffic channel for the call. This step is performed so that the gateway will know the channel on which it should listen for the incoming voice stream associated with the call initiated by the WLAN capable handset. This step may be performed by having the handset send a signaling message to the gateway informing the gateway of the allocated channel and the call identifier. The signaling message may be sent using any suitable protocol capable of carrying data using an underlying WLAN protocol. In one exemplary implementation, the signaling protocol used to carry the information may include TCP/IP. Alternatively, the gateway may learn the traffic channel from the channel assignment message from the BTS. On the WLAN interface, the gateway may identify incoming control and traffic packets from the handset using the MAC address of the handset.

Once the gateway learns the traffic channel, in step 308, the gateway intercepts the incoming voice or media stream from the BTS, converts the voice or media stream to a WLAN protocol, and forwards the voice or media stream to the handset. In step 310, the gateway intercepts the outgoing voice or media stream from the handset, converts the voice or media stream to the air interface protocol, and forwards the voice or media stream to the BTS. Steps 308 and 310 may be performed continuously for the duration of the call. Accordingly, in step 312, the gateway determines whether the call has ended. If the call has not ended, steps 308 and 310 are repeated. If the call has ended, control proceeds to step 314 where the handset signals the BTS that the call has ended. In step 316, the BTS deallocates air interface resources associated with the call. In step 318, the gateway learns that the call has ended. This step may be performed by programming the handset to inform the gateway outside of the air interface signaling or having the gateway listen for the appropriate signals over the air interface. In step 320, the gateway deallocates WLAN and air interface resources.

Thus, using the steps illustrated in FIG. 3, a call can be established with a WLAN-capable handset using the WLAN and air interface protocols in a manner that is transparent to the BTS. Providing such transparency reduces the need for additional equipment or functionality to be provided in the BTS. The BTS is simply required to implement normal air interface procedures.

In order to avoid collisions on the WLAN interface, handset 100 and gateway 106 may implement carrier sense multiple access—collision avoidance procedures (CSMA/CA). In CSMA/CA, as soon as a node receives a packet that is to be sent, it checks to be sure the channel is clear (no other node is transmitting at the time). If the channel is clear, then the packet is sent. If the channel is not clear, the node waits for a randomly chosen period of time, and then checks again to see if the channel is clear. This period of time is called the backoff factor, and is counted down by a backoff counter. If the channel is clear when the backoff counter reaches zero, the node transmits the packet. If the channel is not clear when the backoff counter reaches zero, the backoff factor is set again, and the process is repeated. These procedures may be used by both gateway 106 and handset 100 to avoid collisions on the WLAN interface, especially when multiple handsets are simultaneously communication with gateway 106 via the WLAN interface. In order to further avoid collisions, handset 100 and gateway 106 may implement a physical layer that utilizes spread spectrum communications techniques, such as frequency hopping or direct sequence spread spectrum communications.

Although in the example illustrated in FIGS. 1 and 2, WLAN-BTS gateway 106 and BTS 102 are illustrated as being located remotely from each other, the present invention is not limited to such an embodiment. In alternate embodiment, WLAN-BTS gateway 106 and BTS 102 may be co-located with each other. For example, WLAN-BTS gateway 106 and BTS 102 may both be located in or near building 104. Alternatively, WLAN-BTS gateway 106 and BTS 102 may each be located remotely from building 104. In such an embodiment, building 104 would include a WLAN access point for sending signals to and receiving signals from gateway 106.

In one example described above with respect to FIG. 3, the handset informs the gateway of the traffic and control channels for the call. Such an embodiment results in a simplified protocol stack at the gateway. That is, the gateway is not required to implement the CM, MM, and RR layers implemented by handset 100. In an alternate implementation, WLAN-BTS gateway 106 may have the capability to derive channel information from messages carried by these layers. This would require that WLAN-BTS gateway layer 212 be able to decode messages sent and received by the RR layer. Exemplary messages associated with this layer will be described in detail below. In yet another alternate implementation, the GSM portion 204 of protocol stack 200 may be duplicated in WLAN-BTS gateway 106. In such an embodiment, WLAN-BTS gateway 106 may function as a proxy for WLAN capable handset 100. When functioning as a proxy, WLAN-BTS gateway 106 may receive registration information from WLAN-capable handset 100 in the manner described above. When WLAN-capable handset 100 desires to make a call from within the coverage area of WLAN-BTS gateway 106, WLAN-capable handset may simply send a call initiation request including the dialed digits to WLAN-BTS gateway 106. WLAN-BTS gateway 106 may perform the signaling necessary to allocate a channel with BTS 102 and establish a call with a remote termination. WLAN-BTS gateway 106 may then simply forward the voice or media stream packets to WLAN-capable handset 100 via a WLAN protocol. Similarly, WLAN-BTS gateway 106 may forward the voice or media stream from handset 100 to the remote termination using the air interface protocol.

As described above with respect to FIG. 3, one operating scenario in which WLAN-BTS gateway 106 may be utilized is for mobile originating calls. FIGS. 4A-4D illustrate exemplary messages that may be exchanged between WLAN capable handset 100, WLAN-BTS gateway 106, and BTS 102 in establishing a mobile originated call via a WLAN interface. In the message flow diagram, each block transferred between handset 100, gateway 106, and BTS 102 represents a message. The text within each block represents the message type and the parameters. Referring to the messages in line 1 of FIG. 4A, the text within bracket 400 represents the layer 1 and 2 channels used to carry each message. For the air interface message, the text in bracket 400 the control channel message type. The abbreviation CCCH is generically used to refer to a control channel. The abbreviation RACCH refers to random access channel, which is conventionally used for a communication from a mobile station to a base transceiver station. In the WLAN interface message, the layer 1 and 2 messages are indicated as "WLAN," meaning that layers 1 and 2 on the WLAN interface are WLAN-protocol-formatted instead of air-interface-channel formatted. Exemplary WLAN protocol layers that may be used for replacing layers 1 and 2 of the air interface protocol are the LLC, MAC, PLCP, and PMD layers illustrated in FIG. 2.

In both the message on the air interface and on the WLAN interface, the text within bracket 402 represents the sublayer of layer 3 to which the message belongs. Layer 3 refers to layer 3 of the air interface. The sublayers of layer 3 according to the GSM standard are radio resource management (RR), mobility management (MM), and call control (CC).

The text in bracket 404 represents the air interface layer 3 message type. In the illustrated example, the layer 3 message type is a channel request. The parameters within the brackets of the channel request message represent important parameters of the message. The parameters of the channel request message in line 1 of FIG. 4A are the reason for the request and a channel reference.

Figure 4A:
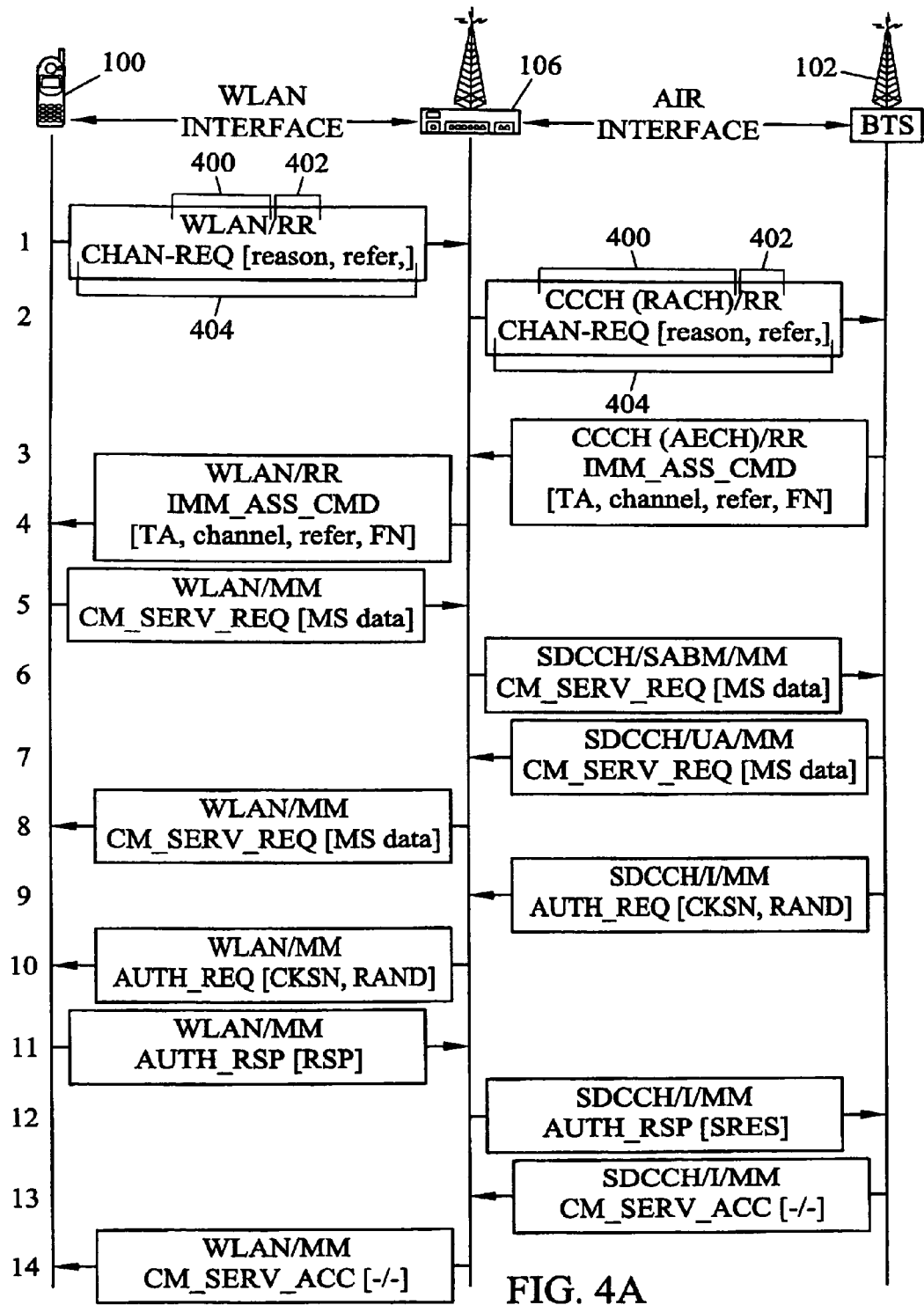
FIGS. 4A-4D are a message flow diagram illustrating exemplary WLAN and air interface signaling used to establish a mobile-originating voice call using a WLAN-BTS gateway according to an embodiment of the present invention.
Figure 4B:
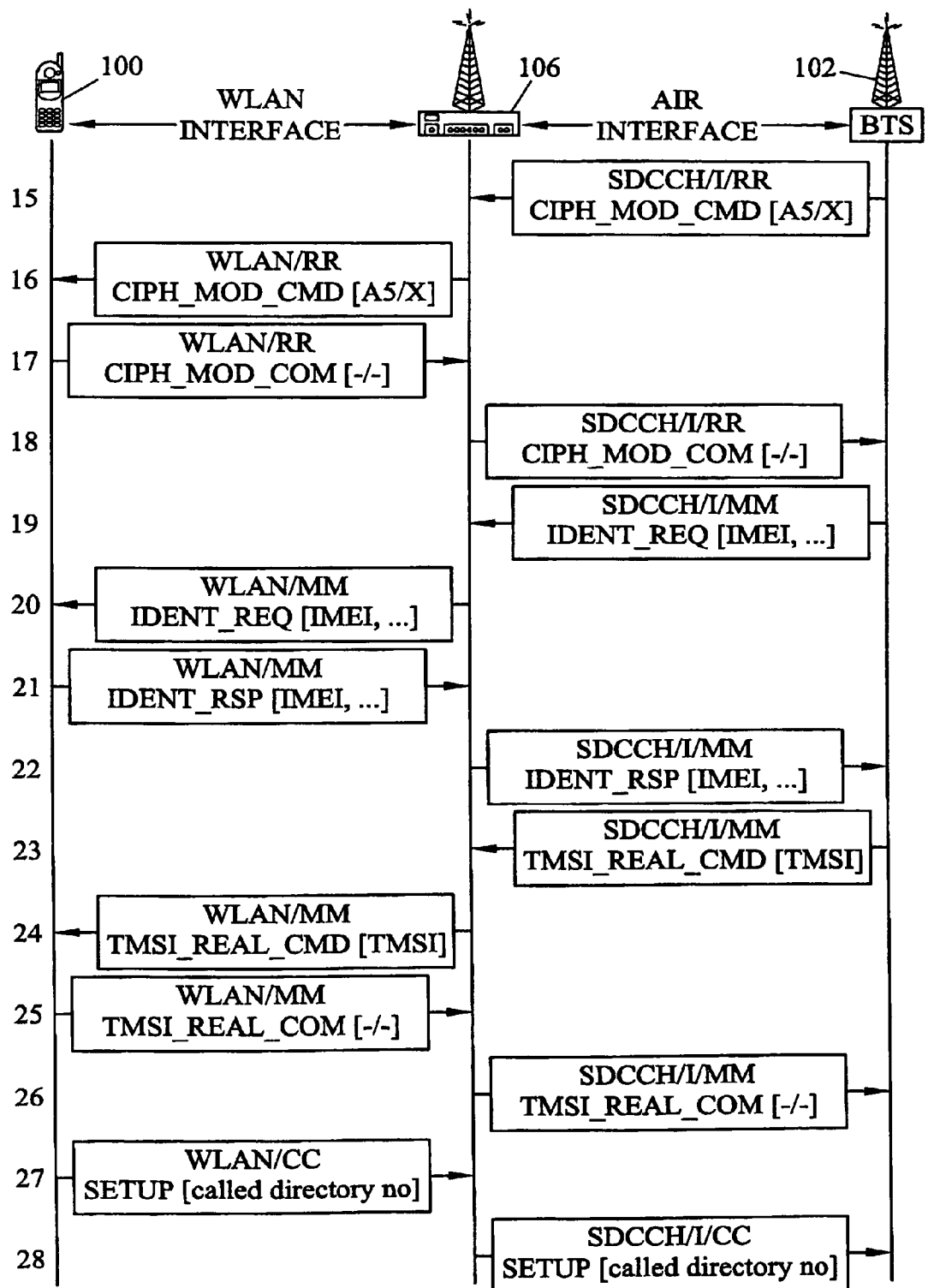
Figure 4C:
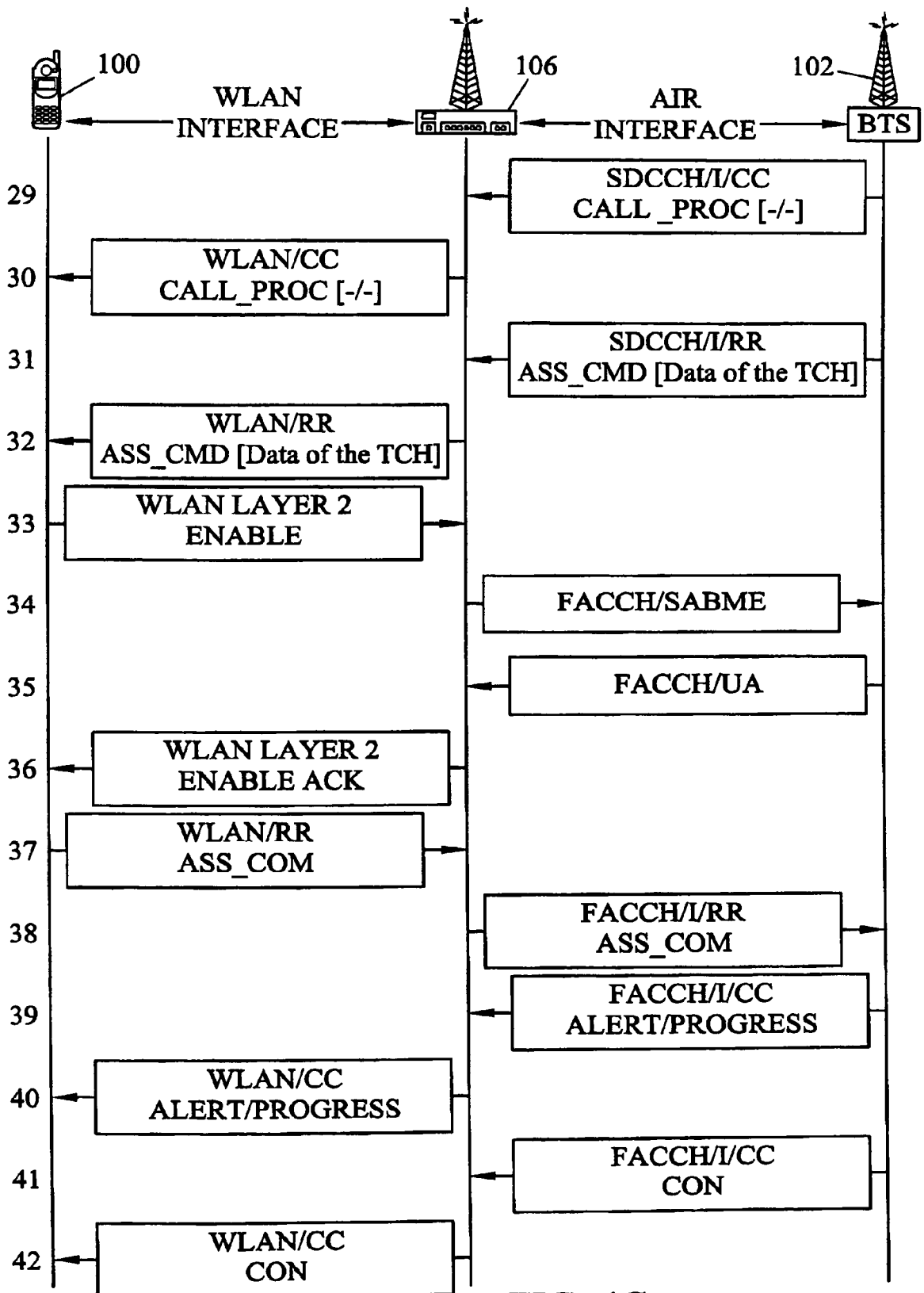
Figure 4D:
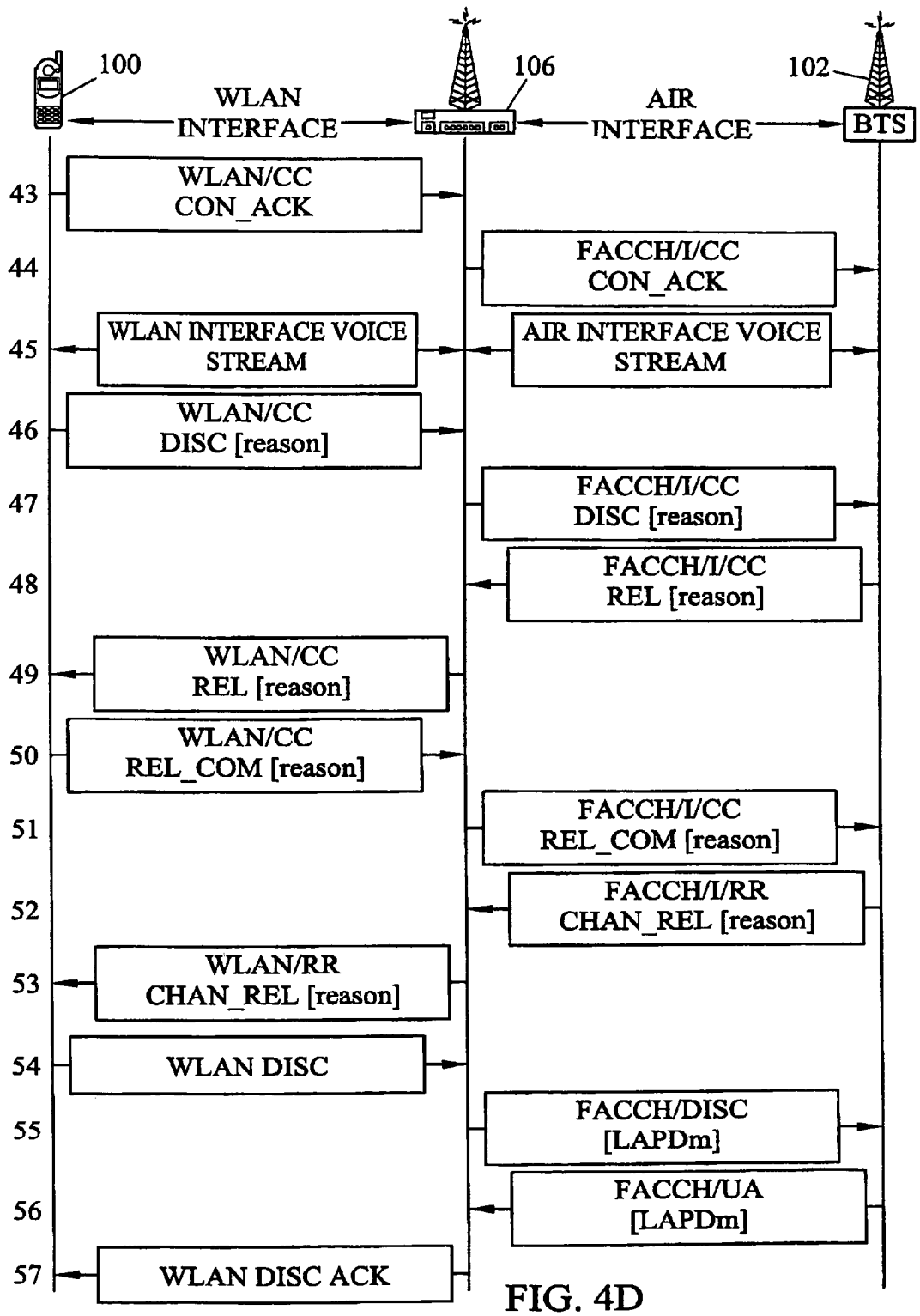

The notation in the messages of lines 1 and 2 of FIG. 4A is used consistently in the drawings. Hence, a description of the notation for every message will not be repeated herein. Specific message types and their functions will now be described in detail.

In line 1 of the message flow diagram illustrated in FIG. 4A, handset 100 sends a channel request message to gateway 106 via the WLAN interface. Gateway 106 receives the message and formulates a corresponding message on the random access control channel of the air interface (line 2). In response to receiving the channel request message, BTS 102 signals its base station controller to obtain a control channel. When BTS 102 receives a control channel, in line 3 of the message flow diagram, BTS 102 sends an immediate assign command (IMM_ASS_CMD) message to gateway 106. The immediate assignment command contains all information for the assignment of a stand-alone dedicated control channel between mobile station 100 and BTS 102. Because layer 3 is implemented on handset 100, in line 4 of the message flow diagram, gateway 106 forwards the immediate assignment command message to mobile station 100. In line 5 of the message flow diagram, handset 100 formulates a communications service request message and sends the message to gateway 106. The communications service request message requests allocation of a layer 2 channel on the air interface. In line 6 of the message flow diagram, gateway 106 formulates a corresponding synchronous balanced mode extended frame (SABME) requesting the layer 2 channel assignment from BTS 102. In line 7 of the message flow diagram, the BTS confirms that a layer 2 connection has been established by repeating the CM_SERV_REQ message to gateway 106. In line 8 of the message flow diagram, gateway 106 sends the CM_SERV_REQ message to handset 100 via the WLAN interface.

In line 9 of the message flow diagram, BTS 102 sends an authentication request message to gateway 106. In line 10 of the message flow diagram, gateway 106 forwards the authentication request message to handset 100. The SIM card in mobile station 100 calculates the SRES by applying the random number RAND and the parameter $K_i$ to the encryption algorithm A3, which is specified in the GSM standards documents. In line 11 of the message flow diagram, handset 100 sends the result of the calculation in line 10 to gateway 106 via the air interface. In line 12 of the message flow diagram, gateway 106 sends the corresponding message over the dedicated control channel in a layer 2 I (information) frame. The message is eventually forwarded to a VLR, which compares the SRES with a corresponding value obtained from the mobile subscriber's HLR. In this example, it is assumed that the values match. Accordingly, in line 13 of the message flow diagram, BTS 102 sends a communications service acceptance (CM_SERV_ACC) message indicating that the service request sent to the MSC has been processed and accepted. In line 14 of the message flow diagram, gateway 106 sends the CM_SERV_ACC message to handset 100.

If ciphering is active, then no communication service acceptance message is sent but ciphering is switched on. For this purpose, the MSC/VLR sends information to BTS 102 and to handset 100. In lines 15 and 16 of the message flow diagram, the ciphering mode command (CIPH_MOD_CMD) is sent to handset 100 via gateway 106. The ciphering mode command includes the algorithm A5/X, which is to be used to perform the ciphering on the air interface. In lines 17 and 18 of the message flow diagram, handset 100 sends a ciphering mode complete (CIPH_MOD_COM) message to BTS 102 indicating that the ciphering mode command message has been received and that the ciphering mode has been set.

In lines 19 and 20 of the message flow diagram, BTS 102 sends an identify request message to handset 100 if equipment checking is being performed. The identify request message may originate from an MSC/VLR. The identify request message may request the IMEI, the IMSI, and/or the TMSI. In lines 21 and 22 of the message flow diagram, handset 100 transmits its IMEI and/or other handset- and/or subscriber-identifying parameters to BTS 102 and the corresponding MSC. The MSC can use the IMEI to determine whether the handset is stolen and properly registered. In lines 23 and 24 of the message flow diagram, BTS 102 sends a temporary mobile station identifier (TMSI) assigned by an MSC/VLR to handset 100 via gateway 106. The TMSI is used to make unauthorized tracking of the mobile subscriber more difficult. The TMSI is communicated to handset 100 in a TMSI reallocation command (TMSI_REAL_CMD message). In lines 25 and 26, handset 100 sends a TMSI reallocation complete (TMSI_REAL_COM message) to BTS 102 via gateway 106 indicating that the TMSI has been received and stored.

In order to initiate the call, handset 100 formulates a setup message including the called directory number. In line 27 of the message flow diagram, handset 100 sends the setup message to gateway 106 via the WLAN interface. In line 28 of the message flow diagram, gateway 106 sends the setup message to BTS 102 via a layer 2 I frame on the stand-alone dedicated control channel allocated for the communications session ISDN networks, the setup message is converted into an IAM message and sent to the destination end office in order to setup the connection. Once the IAM message is sent, the network confirms with a call proceeding (CALL_PROC) message. In lines 29 and 30 of the message flow diagram, BTS 102 sends the call proceeding message to handset 100 via gateway 106.

In line 31 of the message flow diagram, BTS 102 sends an assignment command (ASS_CMD) that contains the traffic channel for the call. As discussed above, gateway 106 may either extract the traffic channel from the assignment command, or handset 100 may inform gateway 106 of the traffic channel by a separate message so that gateway 106 can receive the voice or media stream associated with the call. In line 32 of the message flow diagram, gateway 106 sends the assignment command with the traffic channel to mobile station 100 via the WLAN interface. In lines 33-36 of the message flow diagram, layer 2 connections are set up on the WLAN interface and on the air interface. The layer 2 connection on the air interface may be established using standard air interface signaling. The layer 2 connection on the WLAN interface may be established using IEEE 802.2 logical link control layer signaling. In line 37 of the message flow diagram, handset 100 sends an assignment command to gateway 106 establish a layer 3 connection over the traffic channel. In line 38 of the message flow diagram, gateway 106 sends the assignment command to BTS 102 over the air interface.

When the MSC receives an address complete message (ACM) the MSC may send an alert message or a progress message to indicate either that the call is progressing or that a ring tone is being generated. In lines 39 and 40 of the message flow diagram, the alert/progress message is delivered from BTS 102 to handset 100 via gateway 106.

When the called party answers the call, the end office or MSC corresponding to the called party sends an ISUP answer (ANS) message to the calling party MSC. When this occurs, the calling party MSC sends a connect (CON) message to the base station controller. The base station controller forwards the connect message to BTS 102. In line 41 of the message flow diagram, BTS 102 sends the connect message to gateway 106 via the air interface. In line 42 of the message flow diagram, gateway 106 sends the connect message to handset 100. In lines 43 and 44 of the message flow diagram, handset 100 sends a connection acknowledgement message to BTS 102. The connection acknowledgement message is forwarded through the network to the called party end office.

Once the connection acknowledgement message has been received, voice packets can be transmitted between the calling and called parties via the WLAN interface and the air interface. Because gateway 106 knows the air interface traffic channel allocated for the call and the MAC address of handset 100, gateway 106 can identify packets associated with the call on both interfaces and convert the packets between the WLAN and air interface protocols.

When one of the parties desires to disconnect, the disconnecting party sends a disconnect message to the other party. In this example, the calling party corresponding to handset 100 sends the disconnect message. Accordingly, in lines 46 and 47 of the message flow diagram, handset 100 sends a disconnect message to BTS 102 via gateway 106. In response to the disconnect message, the called party sends a release message. In lines 47 and 48 of the message flow diagram, BTS 102 sends the release message to handset 100 via gateway 106.

In response to the release message, handset 100 generates a release complete message. In lines 50 and 51 of the message flow diagram, handset 100 sends the release complete message to BTS 102 via gateway 106. Receipt of the release complete message indicates the end of the call. After the call is ended from the call control perspective, the occupied traffic channel on the air interface must be released. For this purpose, the calling party MSC sends a clear command message to the BSC. The BSC forwards a channel release message to BTS 102 and mobile handset 100. In lines 54-57 of the message flow diagram, handset 100 and gateway 106 exchange messages with each other and with BTS 102 to release the layer 2 connection on the WLAN and air interfaces The layer 2 connection on the air interface may be established using standard air interface signaling. The layer 2 connection on the WLAN interface may be established using IEEE 802.2 logical link control layer signaling. Thus, using the steps illustrated in FIGS. 4A-4D, the signaling and voice or media stream associated with a call can be transparently transmitted through gateway 106 via a WLAN interface and thereby enable calls in areas of low signal strength on the air interface.

Figure 5A:
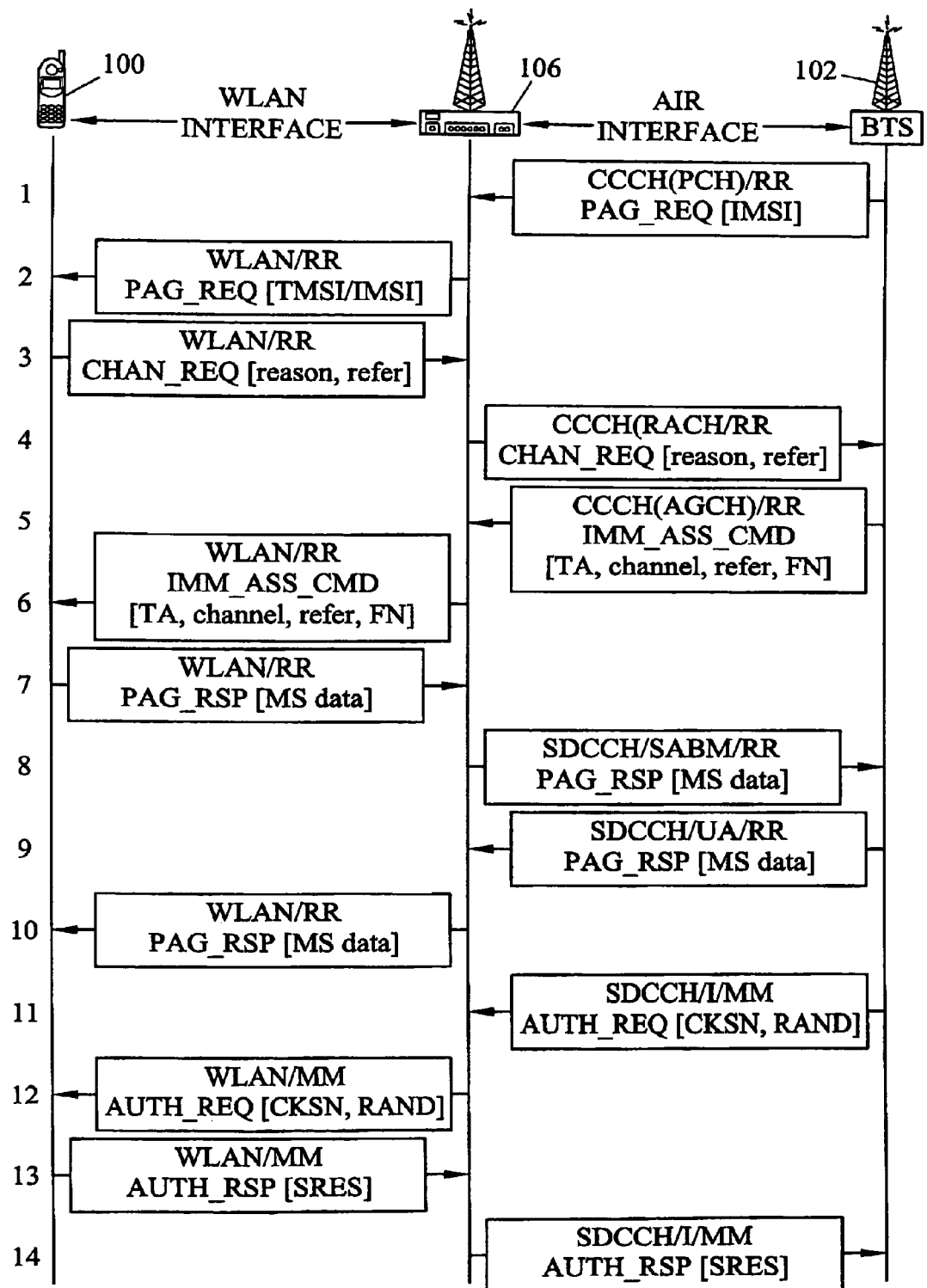
FIGS. 5A-5D are a message flow diagram illustrating exemplary WLAN and air interface signaling associated with establishing a mobile-terminating voice call using a WLAN-BTS gateway according to an embodiment of the present invention.
Figure 5B:
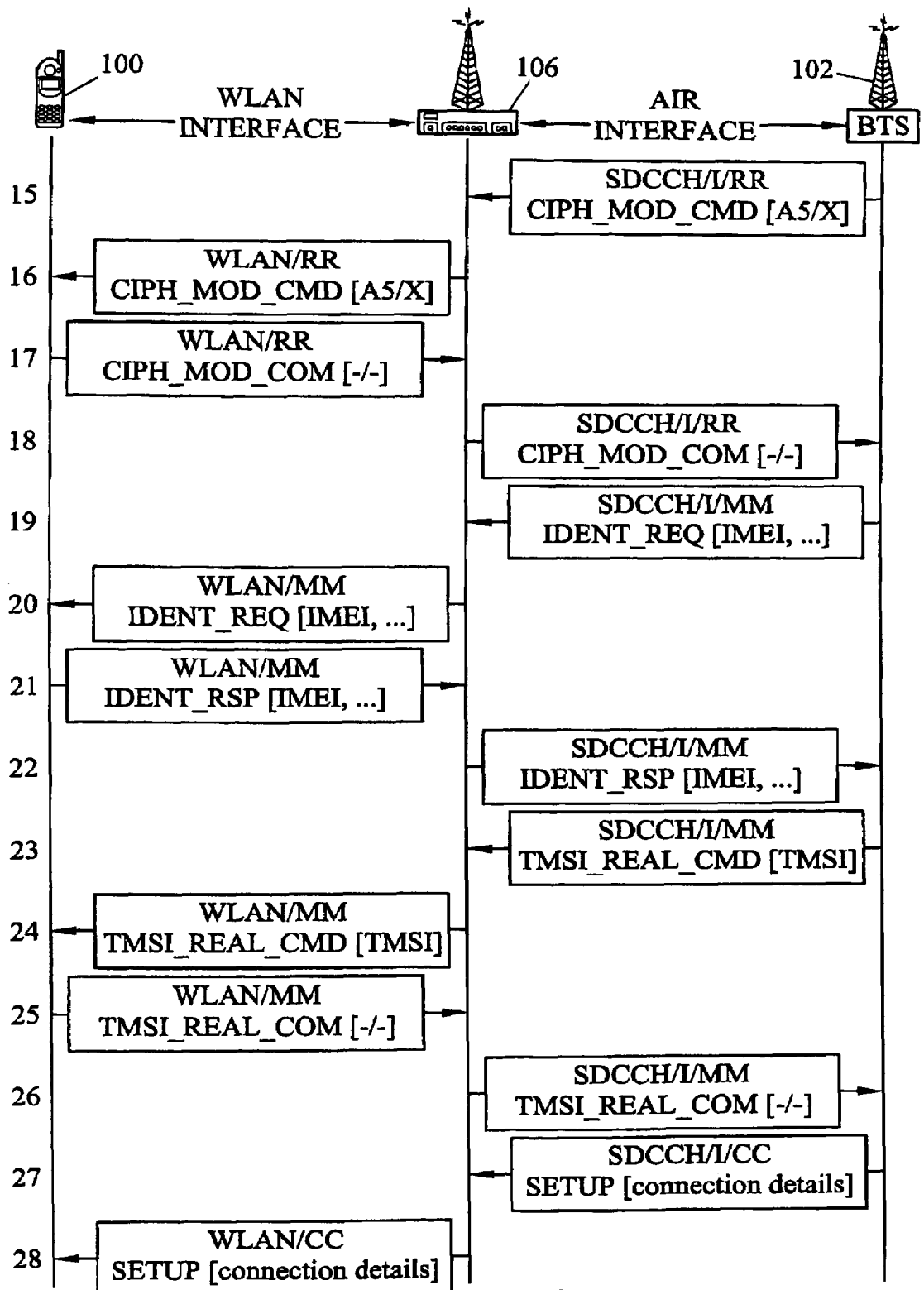
Figure 5C:
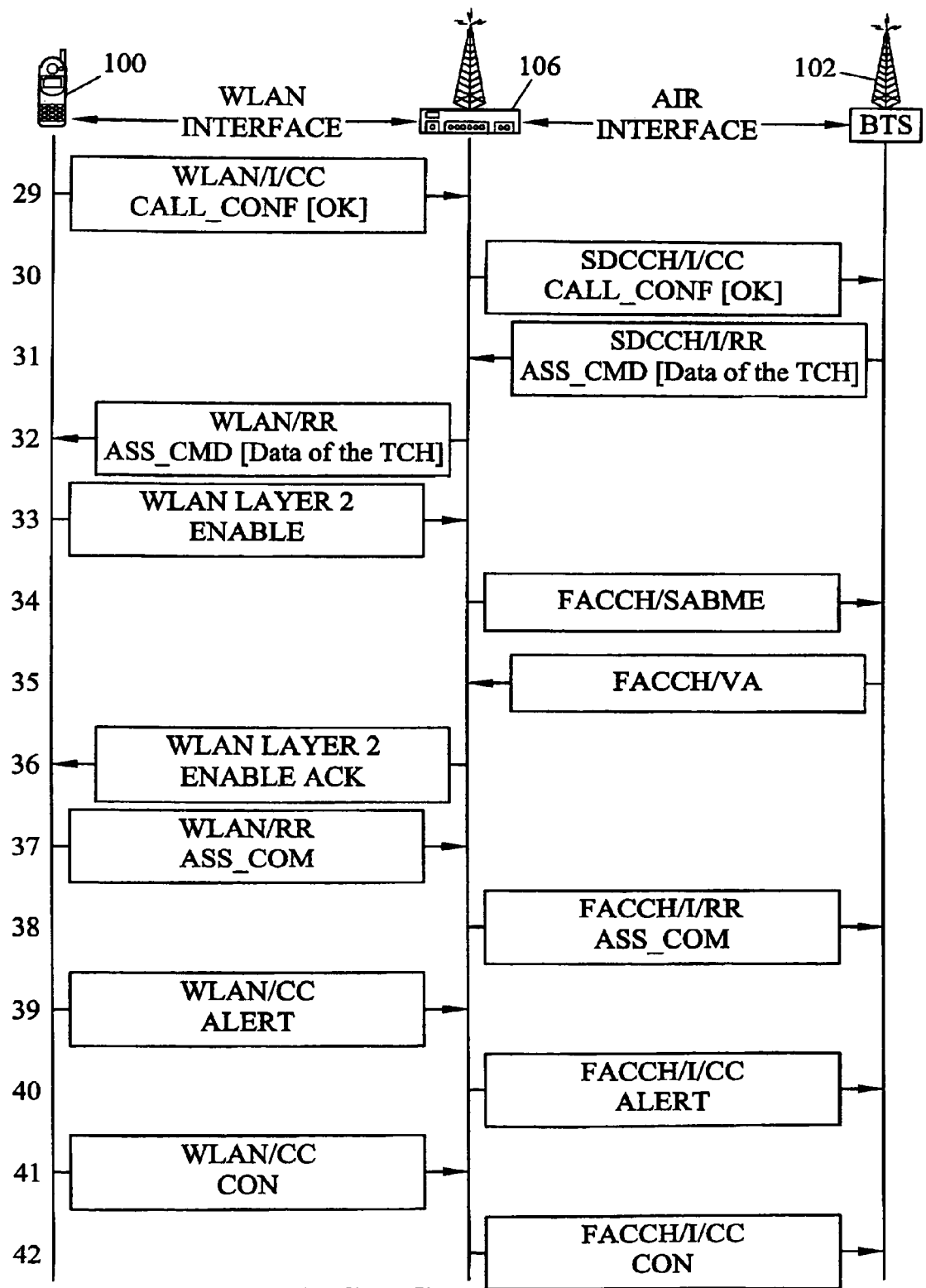
Figure 5D:
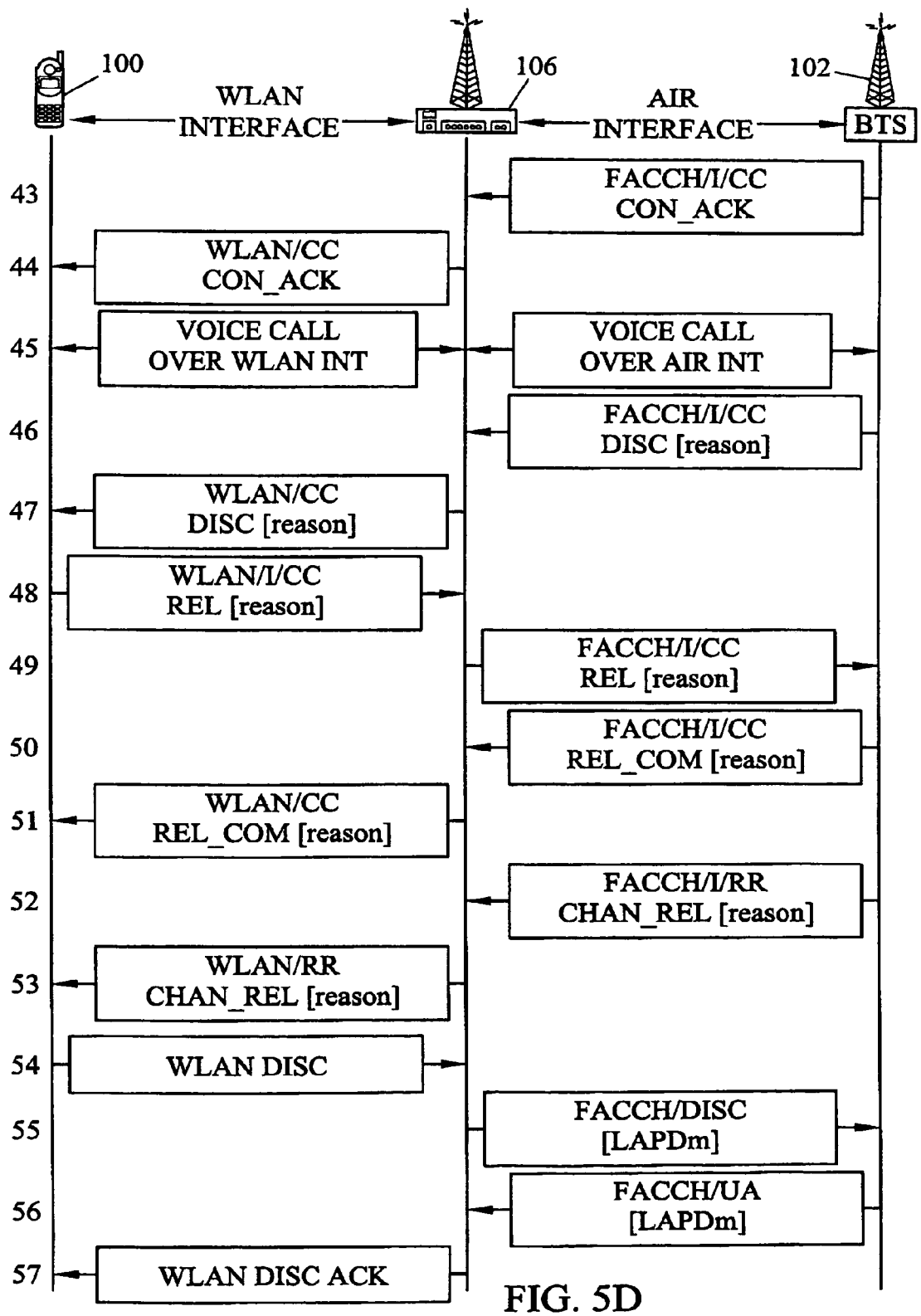

In addition to allowing mobile originating call over a WLAN interface, a WLAN-BTS gateway of the present invention also enables mobile terminating calls over the air interface. FIGS. 5A-5D illustrate exemplary messages that may be exchanged in setting up a mobile terminating call using gateway 106. Referring to FIG. 5A, in line 1 of the message flow diagram, when an incoming call arrives at an MSC/VLR, the MSC/VLR requests that paging request (PAG_REQ) messages to be sent by all BTSs that belong to the current location area of the called mobile station. When the BTSs are connected to different BSCs, one paging request is sent per BSC. Accordingly, in line 1 of the message flow diagram, BTS 102 sends a paging request message to handset 100 via gateway 106. If the mobile station is reachable, the mobile station responds by requesting a control channel as indicated in line 3 of the message flow diagram. Lines 4-57 of the message flow diagram are the same as the corresponding messages described above for the mobile originating case. Hence, a description thereof will not be repeated herein. Thus, using the steps illustrated in FIGS. 5A-5C, mobile terminating calls may be established with a mobile handset via a WLAN interface even in areas with poor GSM air interface coverage.

Figure 6:
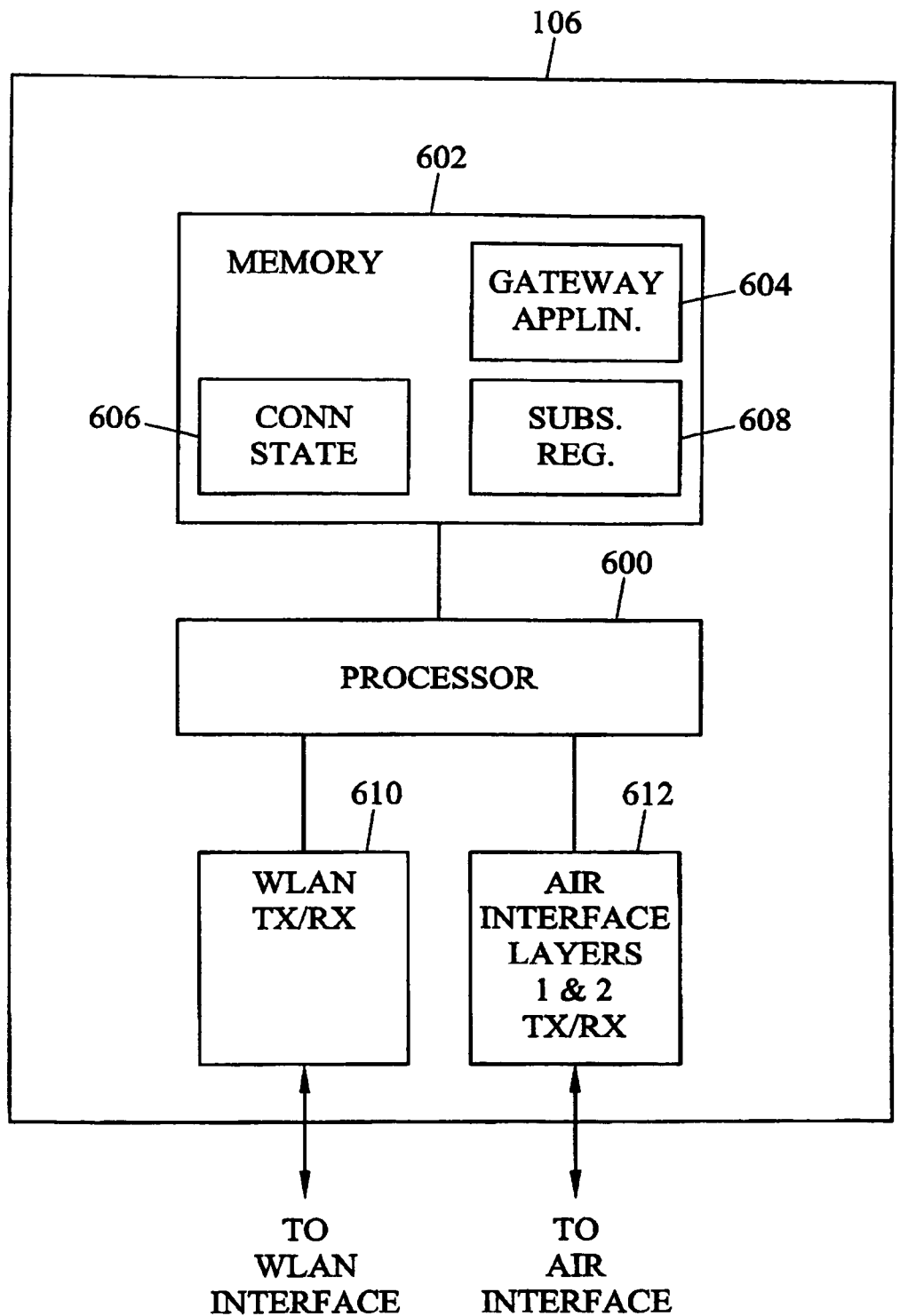
FIG. 6 is a block diagram illustrating an exemplary architecture for a WLAN-BTS gateway according to an embodiment of the present invention.

FIG. 6 is a block diagram illustrating exemplary components of WLAN-BTS gateway 106 according to an embodiment of the present invention. Referring to FIG. 6, gateway 106 includes a processor 600 that controls the overall operation of gateway 106. Memory 602 stores a gateway application 604 that converts between the WLAN and air interfaces using the steps described above with regard to FIG. 3. Memory 602 also stores connection state information 606, such as the current channels being used by different subscribers and subscriber registration information 608.

In order to send and receive data over the WLAN interface, gateway 106 includes a WLAN transceiver 610. WLAN transceiver 610 may implement layers 1 and 2 of the WLAN protocol stack illustrated in FIG. 2. Exemplary WLAN protocols that may be implemented by transceiver 610 include any of the 802.11 family of protocols, Bluetooth, Hiperlan, 802.16, CDMA, CDMA2000, WCDMA, or 802.20.

In order to communicate via the air interface, gateway 106 also includes an air interface layers 1 and 2 transceiver 612. Transceiver 612 may implement layers 1 and 2 of the GSM air interface protocol stack illustrated in FIG. 2. Transceiver 612 may be implemented using any suitable chipset available for implementing layers 1 and 2 of an air interface protocol, such as the air interface protocol specified by GSM.

Figure 7:
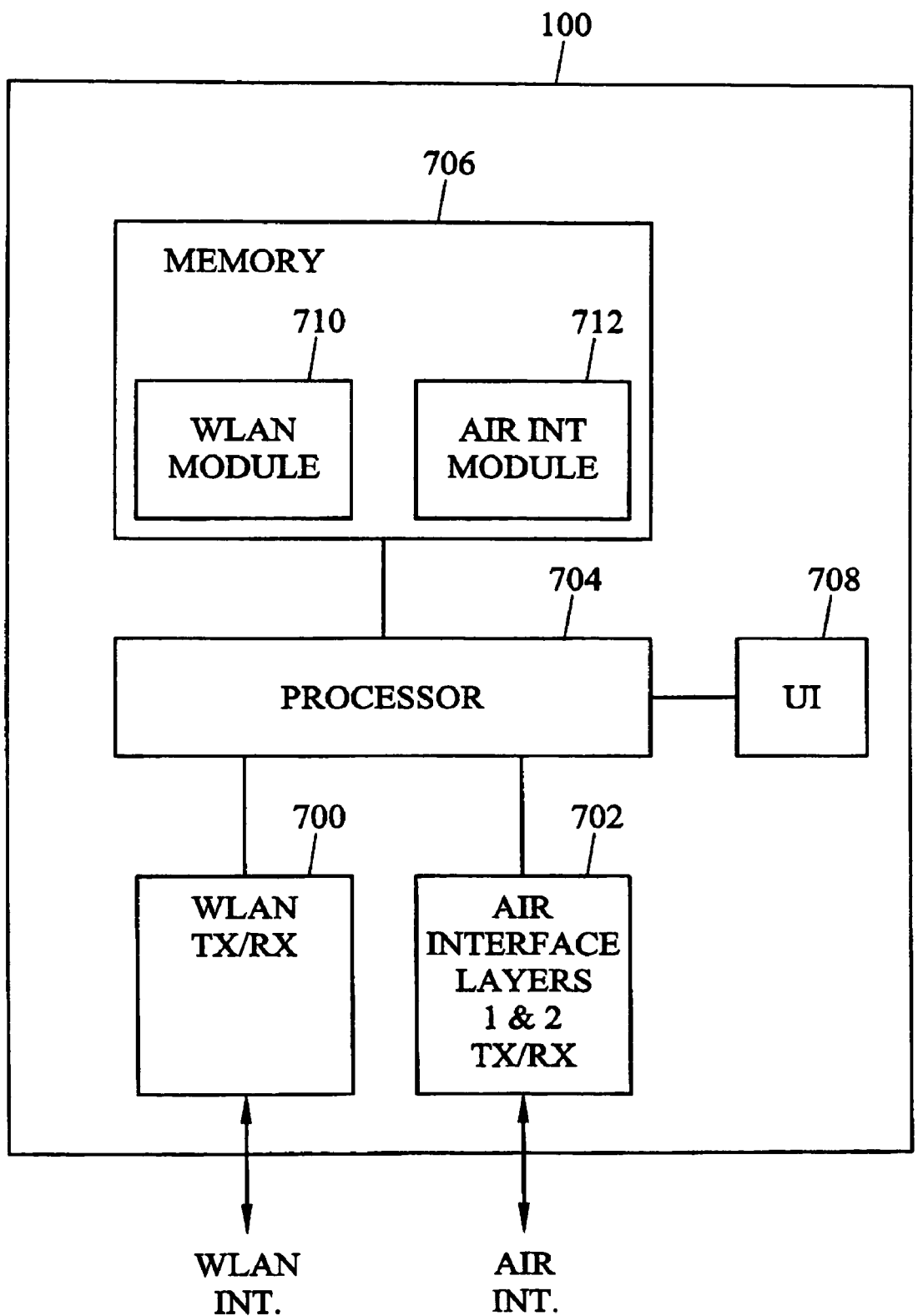
FIG. 7 is a block diagram illustrating an exemplary architecture for a WLAN- and air-interface-capable handset according to an embodiment of the present invention.

FIG. 7 is a block diagram of an exemplary WLAN-capable handset suitable for use with embodiments of the present invention. Referring to FIG. 7, handset 100 includes a WLAN transceiver and an air interface layers 1 and 2 transceiver 702. Transceivers 700 and 702 may be implemented using the same chipsets as transceivers 610 and 612 described above. Handset 100 also includes a processor 704, memory 706, and a user interface 708. Processor 704 controls the overall operation of handset 100. Memory 706 includes a WLAN module 710 for controlling communications by handset 100 over a WLAN interface and an air interface module 712 for controlling communications by handset 100 when communicating solely over the air interface. In one implementation, user interface 708 may enable a user to manually switch between the WLAN and air interfaces by activating either WLAN module 710 or air interface module 712. In addition, handset 100 may be configured to automatically switch between WLAN and air interface modes of operation, for example, when signal strength on one interface falls below a predetermined value.

Thus, the methods and systems described above enable voice communications to occur in areas where air interface signal strength is weak due to undesirable signal effects. By providing a gateway that implements both WLAN and air interface protocols and that is transparent to the base transceiver station, seamless communication in areas of low signal strength is achieved.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for transparently initiating and terminating voice calls with a mobile handset using a wireless local area network (WLAN)—base transceiver station (BTS) gateway, the method comprising:
 (a) Initiating a call from a mobile handset using layer 3 air interface signaling carried over a WLAN interface;
 (b) at a WLAN-BTS gateway, learning an air interface control channel and an air interface traffic channel allocated to the call;
 (c) at the gateway, intercepting an incoming voice or media stream associated with the call, converting the incoming voice stream from an air interface protocol to a WLAN protocol, and forwarding the incoming voice stream to the mobile handset via the WLAN protocol; and
 (d) at the gateway, receiving an outgoing voice stream associated with the call, converting the outgoing voice stream from the WLAN protocol to the air interface protocol and forwarding the outgoing voice stream to the base transceiver station.

2. The method of claim 1 wherein initiating the call includes sending radio resource management message from the handset over the WLAN interface.

3. The method of claim 1 wherein initiating the call includes sending call control messages over the WLAN interface.

4. The method of claim 1 wherein initiating the call includes sending mobility management messages over the WLAN interface.

5. The method of claim 1 wherein learning the air interface control channel and the air interface traffic channel includes learning the channels from the layer 3 air interface signaling.

6. The method of claim 1 wherein learning the channels includes sending a message from the handset to the gateway notifying the gateway of the channels.

7. The method of claim 1 wherein steps (b)-(d) are performed transparently to the base station subsystem.

8. The method of claim 1 wherein the air interface protocol includes a LAPDm layer and at least one of a TDMA, a CDMA, or an FDMA layer.

9. The method of claim 1 wherein the air interface protocol includes a MAC layer and at least one of a GPRS, UMTS, W-CDMA, or CDMA2000 layer.

10. The method of claim 1 wherein the WLAN protocol includes at least one of an 802.11a, b, or g protocol layer.

11. The method of claim 1 wherein the WLAN protocol includes at least one 802.16x protocol layer.

12. The method of claim 1 wherein the WLAN protocol includes at least one 802.20x protocol layer.

13. The method of claim 1 comprising, at the handset, automatically switching from the WLAN protocol to the air interface protocol during a call in response to moving outside of an area served by the WLAN.

14. The method of claim 1 comprising, at the handset, automatically switching from the air interface protocol to the WLAN protocol during a call in response to moving into an obstructed area or other area not served by the air interface protocol.

15. A method for transparently initiating and terminating voice calls with a mobile handset using a wireless local area network (WLAN)—base transceiver station (BTS) gateway, the method comprising:
   (a) registering a mobile handset with a WLAN-BTS gateway;
   (b) sending a call initiation request from a mobile handset to the WLAN-BTS gateway using a WLAN interface;
   (c) at a WLAN-BTS gateway, invoking a proxy call agent on behalf of the mobile handset that establishes a call via a BTS air interface control channel and a BTS air interface traffic channel;
   (d) at the gateway, intercepting an incoming voice or media stream associated with the call, converting the incoming voice or media stream from an air interface protocol to a WLAN protocol, and forwarding the incoming voice or media stream to the mobile handset via the WLAN protocol; and
   (e) at the gateway, receiving an outgoing voice or media stream associated with the call, converting the outgoing voice or media stream from the WLAN protocol to the air interface protocol and forwarding the outgoing voice or media stream to the base transceiver station.

16. A wireless local area network (WLAN)—base transceiver station (BTS) air interface gateway comprising:
   (a) a WLAN interface for sending and receiving voice streams associated with voice calls to and from mobile handsets using a WLAN protocol;
   (b) a BTS air interface for sending and receiving voice streams associated with voice calls to and from a base station subsystem using an air interface protocol; and
   (c) a gateway application for learning air interface control and traffic channels associated with a call, for forwarding layer 3 air interface signaling associated with a call between a handset and a BTS, and for converting voice streams associated with the call between WLAN and air interface protocols.

17. The gateway of claim 16 wherein the WLAN interface includes at least one of an 802.11a, b, or g interface layer.

18. The gateway of claim 16, wherein the WLAN protocol includes at least one 802.16x protocol layer.

19. The gateway of claim 16 wherein the WLAN protocol includes at least one 802.20x protocol layer.

20. The gateway of claim 16 wherein the air interface protocol includes a LAP-Din layer and at least one of an FDMA, a CDMA, a UMTS or a TDMA layer.

21. The gateway of claim 16 wherein the air interface protocol includes a MAC layer and at least one of a GPRS, UMTS, W-CDMA, or CDMA2000 layer.

22. The gateway of claim 16 wherein the gateway application learns the air interface and traffic control channels based on the layer 3 air interface signaling.

23. The gateway of claim 16 wherein the gateway application learns the air interface control and traffic channels based on a message received from the handset.

24. A system for transparently providing voice communications to a mobile subscriber using a wireless local area network (WLAN) in combination with a base transceiver station (BTS) air interface, the system comprising:
   (a) a mobile handset for signaling with a BTS using layer 3 air interface protocol messages to establish a control channel and a traffic channel with the BTS and for sending and receiving the layer 3 air interface protocol messages and voice packets using a WLAN protocol; and
   (b) a WLAN-BTS gateway for learning the control channel and the traffic channel and for transparently communicating the layer 3 air interface protocol messages and the voice packets between the BTS and the handset using the WLAN protocol and layer 1 and 2 air interface protocols.

25. The system of claim 24 wherein the mobile handset includes a WLAN transceiver and an air interface transceiver and a user interface for switching between WLAN and air interface modes of operation.

26. The system of claim 24 wherein the mobile handset is automatically switches between the WLAN and air interface modes of operation.

27. The system of claim 24 wherein the mobile handset is communicates the traffic and control channels to the WLAN-BTS gateway outside of the layer 3 signaling messages.

28. The system of claim 24 wherein the WLAN-BTS gateway automatically learns the control channel and the traffic channel based on the layer 3 air interface signaling messages.

* * * * *